United States Patent [19]
Szczepanek et al.

[11] Patent Number: 5,784,573
[45] Date of Patent: Jul. 21, 1998

[54] MULTI-PROTOCOL LOCAL AREA NETWORK CONTROLLER

[75] Inventors: Andre Szczepanek, Bedford, England; Denis R. Beaudoin, Missouri City, Tex.

[73] Assignee: Texas Instruments Incorporated, Dallas, Tex.

[21] Appl. No.: 334,470

[22] Filed: Nov. 4, 1994

[51] Int. Cl.$^6$ .............................. G06F 13/42; H04L 12/28
[52] U.S. Cl. ...................... 395/200.8; 395/860; 370/463; 370/466
[58] Field of Search .................. 395/200.12, 200.13, 395/200.14, 200.17, 200.2, 831, 834, 849, 850, 860, 200.58, 200.8, 200.63, 200.66, 200.67; 340/825.5, 825.51; 370/85.2, 85.3, 85.6, 463, 466, 477; 364/238.5, 240.8, 241.2, 241.6, 242.94, 242.95, 242.96, 242.5, 284.4, 927.96, 929, 940.62, 940.81

[56] References Cited

U.S. PATENT DOCUMENTS

| | | | |
|---|---|---|---|
| 5,299,193 | 3/1994 | Szczepanek | 370/85.1 |
| 5,305,317 | 4/1994 | Szczepanek | 370/85.5 |
| 5,321,819 | 6/1994 | Szczepanek | 395/325 |
| 5,391,094 | 2/1995 | Kakinoki et al. | 439/638 |
| 5,410,535 | 4/1995 | Yang et al. | 370/13 |
| 5,457,601 | 10/1995 | Georgopulos et al. | 361/686 |
| 5,509,121 | 4/1996 | Nakata et al. | 395/200.1 |
| 5,541,957 | 7/1996 | Lau | 375/258 |

OTHER PUBLICATIONS

Comer, D.E., Internetworking With TCP/IP vol. 1:Principles, Protocols, and Architecture Second Edition; ISBN 0-13-468505-9; Chapter 10 pp. 139-157, 1991.

EETImes; "Brooktree, DEC, TI Tip Plans to Support 100-MBit/S Spec: Three get behind Fast Ethernet"; Issue 812, Aug. 29, 1994.

CommunicationsWeek; "Compaq TI Team Up Thunder—LAN to handle new and old LAN types"; Issue 521, Aug. 29, 1994.

*Primary Examiner*—Mark H. Rinehart
*Attorney, Agent, or Firm*—J. Dennis Moore; James C. Kesterson; Richard L. Donaldson

[57] ABSTRACT

A local area network ("LAN") controller operable in an IEEE 802.3u network and an IEEE 802.12 network. A common physical connector is used for both standards, attached to an attachment medium such as a card. An 802.3u circuit is attached to the card, implementing the following 802.3u functions: A media access controller ("MAC") layer, and a physical media independent ("PMI") layer that provides the IEEE 802.3u media independent interface ("MII"). An 802.12 circuit is also attached to the card, implementing the following IEEE 802.12 functions: An LLC layer, an MAC layer, and a PMI layer, providing an MII to a device implementing an 802.12 physical media dependent ("PMD") layer. A circuit coupled to the 802.12 circuit multiplexes, according to a predetermined strategy, 802.12 PMI to PMD signals over the physical connector and, alternatively, communicates 802.3u MII signals between the 802.3u circuit and the physical connector.

3 Claims, 9 Drawing Sheets

| Name | Type | Function |
|---|---|---|
| MTCLK | In | *Transmit Clock:* Transmit clock source from the attached PHY device. |
| MTXD0<br>MTXD1<br>MTXD2<br>MTXD3 | Out | *Transmit Data:* Nibble Transmit data from the LAN Controller. When MTXEN is asserted these pins carry transmit data.<br><br>Data on these pins is always synchronous to MTCLK. |
| MTXEN | Out | *Transmit Enable:* This signal indicates valid Transmit data on MTXD0-3. |
| MTXER | Out | *Transmit Error:* This signal allows coding errors to be propagated across the MII |
| MCOL | In | *Collision Sense:* This signal indicates a network collision. |
| MCRS | In | *Carrier Sense:* This signal indicates a frame carrier signal is being received. |
| MRCLK | In | *Receive Clock:* Receive clock source from the attached PHY device. |
| MRXD0<br>MRXD1<br>MRXD2<br>MRXD3 | In | *Receive Data:* Nibble Receive data from the PMD (Physical Media Dependent) front-end. Data is synchronous to MRCLK.<br><br>Data on these pins is always synchronous to MRCLK. |
| MRXDV | In | *Receive Data Valid:* Indicates data on MRXD0-3 is valid. |
| MRXER | In | *Receive Error:* Indicates reception of a coding error on received data. |
| MDCLK | Out | *Management Data Clock:* Serial management interface to PMI/PHY chip. |
| MDIO | I/O | *Management Data I/O:* Serial management interface to PMI/PHY chip. |
| MRST# | Out | *MII Reset:* Reset signal to the PMI/PHY front-end (Active low). |

| Name | Type | Function |
|---|---|---|
| MTCLK | In | *Transmit Clock:* Transmit clock source from the PMI (Physical Media Independent) device. |
| MTXD0<br>MTXD1<br>MTXD2<br>MTXD3 | Out | *Transmit Data:* Nibble Transmit data from the LAN Controller. When MTXEN is asserted these pins carry transmit data.<br>When MTXEN is not asserted (frame transmission is not in progress).<br>• MTXD0 asserted indicates the LAN Controller is requesting frame transmission.<br>• MTXD1 indicates the priority transmission required: A value of zero indicates normal transmission, a value of one priority transmission.<br>Data on these pins is always synchronous to MTCLK. |
| MTXEN | Out | *Transmit Enable:* This signal indicates valid Transmit data on MTXD0-3. |
| MTXER | Out | *Transmit Error:* This signal allows coding errors to be propagated across the MII. When this signal is asserted the PMI device will force a coding error in the outgoing data. |
| MCOL | In | *Collision Sense:* This (active low) signal is used by the PMI to acknowledge a transmission request and initiate transmission from the LAN controller. The LAN Controller will begin frame transmission 50 MTCLK cycles after the assertion (low) of MCOL. |
| MCRS | In | *Carrier Sense:* Not used. |
| MRCLK | In | *Receive Clock:* Receive clock source from the PMI (Physical Media Independent) device. |
| MRXD0<br>MRXD1<br>MRXD2<br>MRXD3 | In | *Receive Data:* Nibble Receive data from the PMD (Physical Media Dependent) front-end. Data is synchronous to MRCLK.<br>The LAN Controller also reads the frame priority of incoming frames on these pins on the cycle before assertion of MRXDV (The cycle before frame reception begins).<br>• MRXD1 indicates the transmission priority of the received frame: A value of zero indicates normal transmission, a value of one priority transmission.<br>Data on these pins is always synchronous to MRCLK. |
| MRXDV | In | *Receive Data Valid:* Indicates received frame data is on MRXD0-3 |
| MRXER | In | *Receive Error:* Indicates reception of a coding error on received data. |
| MDCLK | Out | *Management Data Clock:* Serial management interface to PMI/PHY chip. |
| MDIO | I/O | *Management Data I/O:* Serial management interface to PMI/PHY chip. |
| MRST# | Out | *MII Reset:* Reset signal to the PMI/PHY front-end (Active low). |

MULTI-PROTOCOL LOCAL AREA NETWORK CONTROLLER

BACKGROUND OF THE INVENTION

1. Field of the Invention

The present invention relates to a LAN controller providing data transfer control between a computer bus and a network, and more particularly relates to such a controller that supports multiple protocols.

2. Background Art

Local area networks (LANs) have become widely accepted within industry as a means by which many work stations can be interconnected so as to share resources such as data and applications, providing considerable cost savings over, for example, a mainframe computer with multiple attached terminals, and providing other benefits as well. One widely accepted LAN arrangement is the so-called "Ethernet" LAN, which is defined in the IEEE 802.3 standard.

With the widespread acceptance of LANs and the onward thrust of technology, however, demand for LAN arrangements having significantly greater data transfer rate has been demanded by industry. Currently, two 100 megabit per second LANs are emerging as potential successors to ethernet. Both are in the process of IEEE standardization, in the LAN standards committee. One, being standardized under IEEE 802.3u, is referred to as "Fast Ethernet" and, alternatively, 100 MBITS SCMA/CD. The other, being standardized under IEEE 802.12, is referred to as 100 VG-AnyLAN and, alternatively, Demand Priority. Both of these approaches have considerable industry support. It would, therefore, be highly desirable to provide a means by which a user could acquire a LAN controller for use in a PC that supports both protocols, at a reasonable cost. This would allow users to purchase a single LAN controller card, without worry that one of these two network protocols may so dominate over the other that transfer from one to another may be necessary, forcing the incurring of an additional cost, potentially.

However, as these two approaches take shape, it is clear that they are quite different. For example, while 802.3u defines a media independent interface ("MII") between a physical media independent ("PMI") layer and a physical media dependent ("PMD") layer, no such definition is provided by 802.12. In addition, while some signal lines are common to both, for example, data lines and transmit clock, more signals are required for interconnection of the PMI and PMD layers, regardless of whether an interface is defined, in 802.12, thus rendering problematic the provision of a product providing a LAN data link function between a computer network layer and a network, physical layer. One could, of course, simply put all of the functionality of both standards on a single card, and provide two connectors, but the cost of such a product would be excessive.

The present invention provides a LAN controller and interface scheme that allows both networks to be supported in a cost effective manner, with the choice of network and media type being an external "plug-in" option.

SUMMARY OF THE INVENTION

According to one aspect of the present invention, the present invention provides a LAN controller operable in an IEEE 802.3u network and in an IEEE 802.12 network. It will be noted that, while both of these protocols are, at the time of filing of the application for this patent, only in the process of standardization, nonetheless in the interest of brevity they are sometimes referred to hereinafter as standards, e.g., "the 802.3u standard," even though they are not, in fact, yet standards. However, enough of the elements of these protocols have been fixed in committee that the principles of the present invention and the description of the embodiments, set forth herein, will be applicable once they are adopted as standards, unless unforeseen radical redirection of these protocols occurs before such adoption, which is seen to be highly unlikely. According to one aspect of the present invention, a physical connector defined to the 802.3u MII connector specification is attached to an attachment medium, to which integrated circuits and physical connectors can be attached and interconnected, such as a plug-in computer card. An 802.3u circuit is attached to the attachment medium, implementing the following functions as defined in the IEEE 802.3u specification: A logical link controller ("LLC") layer, a media access controller ("MAC") layer, and a physical media independent ("PMI") layer, providing the IEEE defined 802.3u media independent interface ("MII"). An 802.12 circuit is attached to the attachment medium, implementing the following functions as defined in the IEEE 802.12 specification: An LLC layer, an MAC layer, and a PMI layer, providing a media independent interface to a device implementing an 802.12 physical media dependent ("PMD") layer. Finally, a circuit is provided that is coupled to the 802.12 circuit and that multiplexes, according to a predetermined strategy, 802.12 PMI to PMD signals over the physical connector and, alternatively, communicates 802.3u MII signals between the 802.3u circuit and the physical connector.

According to another aspect of the present invention there is provided a LAN adapter apparatus and method for transmitting data across an interface from a first unit to a second unit, wherein the LAN adapter may operate according to either of at least a first, collision sense type protocol and a second, demand priority protocol, the first unit including at least the following interface signal lines used for transmitting data according to the first protocol: at least two transmit data signal lines for transferring data to be transmitted over the network from the first unit to the second unit; a transmit enable signal line by which the first unit indicates to the second unit valid data on the at least two transmit data signal lines; and a collision sense line by which the second unit indicates to the first unit that a network collision has occurred. The method includes the following steps for transmitting data from the first unit to the second unit according to the second protocol using the interface signal lines. First, a transmit request signal is provided on a first one of the transmit data signal lines when the transmit enable signal line is not active to indicate valid data. In addition a priority signal is provided on a second one of the transmit data signal lines when the transmit enable signal line is not active to indicate valid data.

According to yet another aspect of the invention, there is provided a LAN adapter apparatus and method by which a first unit receives data from a second unit, wherein the LAN adapter may operate according to either of at least a first, collision sense type protocol and a second, demand priority protocol. The first unit includes the following interface signal lines used to receive data according to the first protocol: at least two receive data signal lines by which the first unit receives data from the second unit; and a receive data valid line by which the first unit indicates to the second unit valid data on the at least two receive data signal lines. The method includes the following steps by which the first unit receives data from the second unit according to the second protocol using the interface signal lines. First, a priority signal is received on a first one of the receive data signal lines prior to the receipt of a receive data valid signal on the receive data valid line. In addition, a data valid signal is received on the data valid line by which a demand that data be received is communicated by the second unit to the first unit.

According to still another aspect of the present invention, a method is provided for communicating an interrupt over a serial data interface, the interface comprising a serial data line and a clock line communicating a clock signal, the serial data interface being used to communicate data, and wherein, when the interface is not otherwise being used to communicate data the serial data line is normally held to its active state. The method includes the following steps. At least one memory location is monitored for the storage therein of a value. The storage in the memory location of a value associated with an interrupt event is sensed. When such a value is sensed, the serial data line is driven to its inactive state. In addition, the serial data line is held at the inactive state for at least one cycle of the clock signal.

DESCRIPTION OF THE DRAWINGS

The above set forth and other features of the present invention are made more apparent in the ensuing detailed description of the preferred embodiment, when read in conjunction with the attached drawings, wherein:

FIG. 4 is a table showing the name, type and function of signals generated at the interface of LAN Controller 10 and PHY 18 by the embodiment of the invention shown in FIG. 1, when operating in 802.12 mode;

DESCRIPTION OF THE INVENTION

Figure 1:
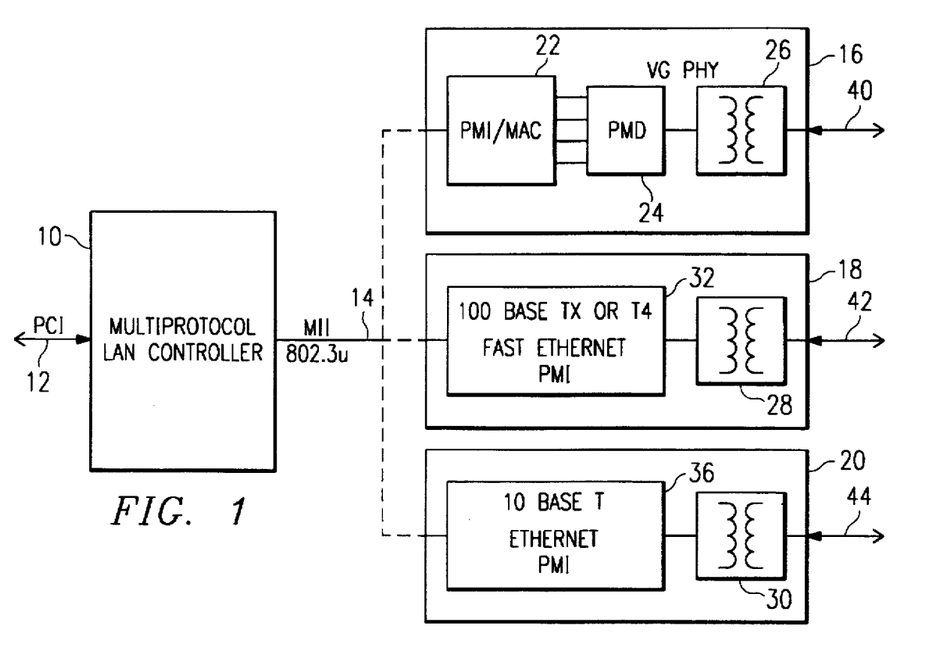
FIG. 1 is a block diagram of a LAN controller subsystem.

A high level block diagram of a preferred embodiment of the present invention is shown in FIG. 1. A multiprotocol LAN Controller 10 connects a system bus, such as a PCI bus 12, to an IEEE 802.3u MII interface 14. Interface 14 connects LAN controller 10 to one of three interconnectable units, called PHY units, or PHYs. They are a VG PHY 16, a Fast Ethernet PHY 18 and a 10 Base T Ethernet PHY 20. The VG PHY 16 includes a PMI block 22, a PMD block 24 and a Media Dependent Interface ("MDI") block 26 connecting to a transmission medium 40 connected to a VG network (not shown). The Fast Ethernet PHY 18 includes a Fast Ethernet PMI 32 connected to an MDI 28 which connects to a transmission medium 42 connected to a Fast Ethernet network (not shown). The ethernet PHY 20 includes a 10 Base T Ethernet PMI unit 36 connected to an MDI 30 connecting to a transmission medium 44 connected to an Ethernet network (not shown).

While the 10 Base T Ethernet PHY 20 is, strictly speaking, not part of the invention herein, nonetheless block 20 is shown in order to illustrate that the preferred embodiment can be implemented including such capability, should the designer desire such additional functionality. Important to note, however, is that a single, multiprotocol LAN Controller 10 is provided that is operable in conjunction with, alternatively, a VG PHY 16 or a Fast Ethernet PHY 18.

Figure 2:
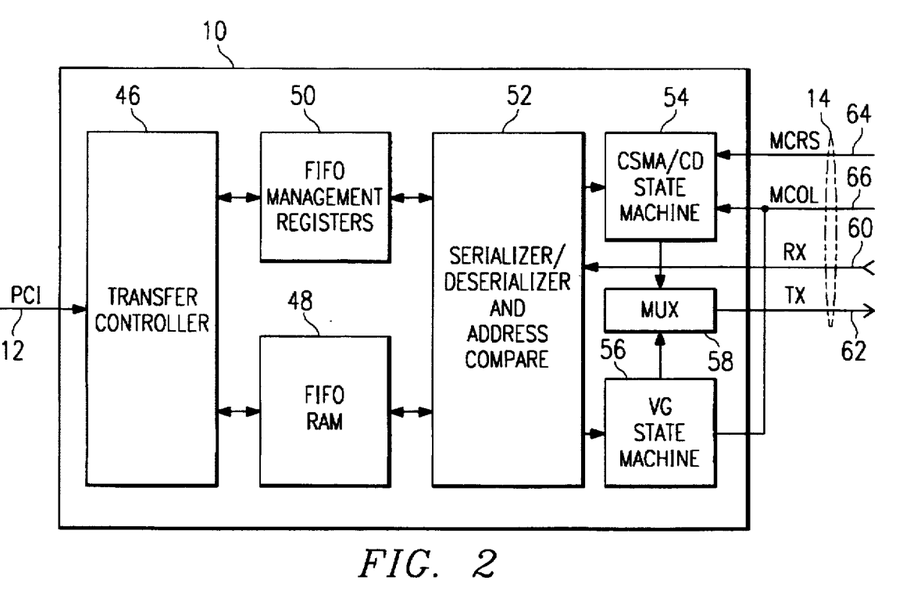
FIG. 2 is a block diagram of a LAN controller according to the preferred embodiment of the present invention.

FIG. 2 is a block diagram showing the functional units internal to the LAN Controller 10. Included are a transfer controller 46, FIFO RAM 48, FIFO management registers 50 and Serializer/Deserializer and Address Compare Unit 52, all of which can be of conventional design implementing known functions according to IEEE 802.3u defined functions. Data received, regardless of protocol, come in on lines RX 60, which are six lines identified hereinbelow as MRXD0–MRXD3, MRXDV and MRXER. Likewise, data are transmitted on TX lines 62, identified hereinbelow as MTXD0–3, MTXEN and MTXER. Data transmitted are provided, alternatively, through a CSMA/CD state machine 54, in 802.3u mode, and VG state machine 56, in 802.12 mode, as shown. These are provided to lines 62 through multiplexer 58. LAN signal MCRS is provided on line 64 to state machine 54, while MCOL signal is provided on line 66 to state machine 54 and state machine 56, as shown.

All of the above described signals are defined in the 802.3u standard, as part of the MII signal set. Other signals that are part of the set, but not shown in FIG. 2, are MTCLK, MCRS, MRCLK, MDCLK, MDIO and MRST#. This latter set of signals is either not used by one of the other protocol, or is used in the same manner for both.

Figure 3:
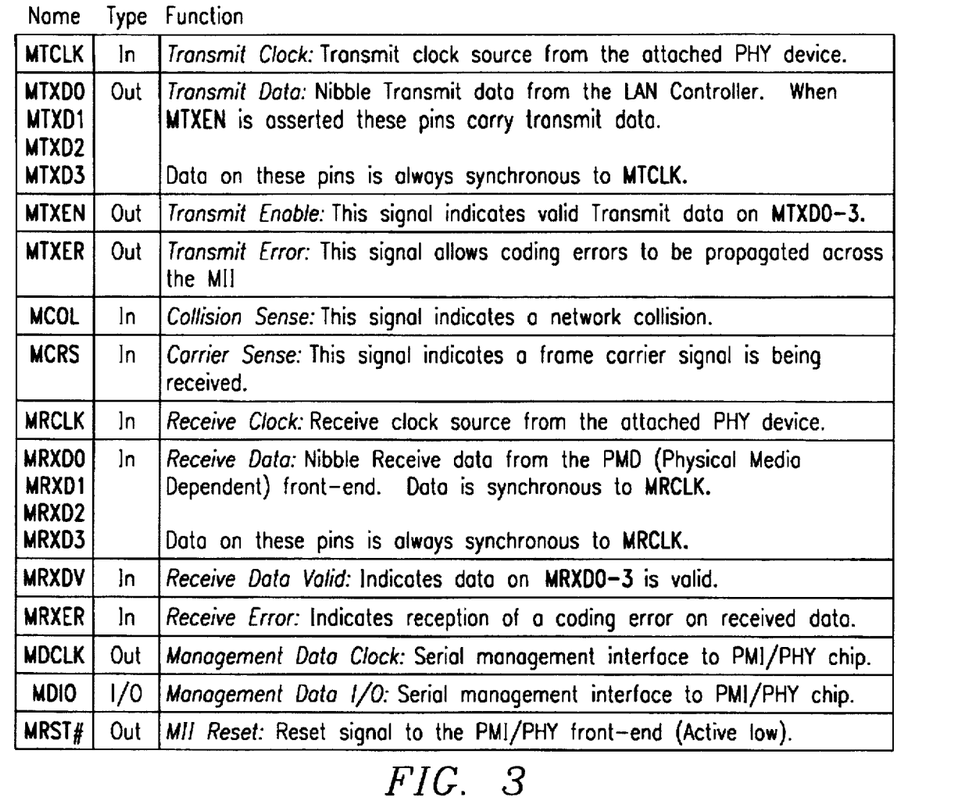
FIG. 3 is a table showing the name, type and function of IEEE 802.3u MII signals, as currently defined, generated at the interface of LAN Controller 10 and PHY 18 by the embodiment of the invention shown in FIG. 1, when operating in 802.3u mode.

As mentioned above, signal lines 14 are provided on a physical connector that is implemented according to the specification for IEEE 802.3u. According to the principals of present invention, the preferred embodiment, shown in FIGS. 1 and 2, provides for the communication of signals across these lines 14 so as to enable connection to a VG PHY 16, as in FIG. 1. FIG. 3 shows the signal lines described above, with their functions as called for in 802.3u. FIG. 4 is a table showing the same signal lines, however, showing functionality implementive of 802.12 signals. Thus, for example, while lines MTXD0–MTXD3 carry nibble transmit data in both modes, to accommodate the additional signal requirements of the 802.12 protocol, these lines are used when MTXEN is not asserted to indicate LAN controller frame transmission requests and priority transmission required. The receive data lines, MRXD0–MRXD3 communicate nibble receive data in both modes, but in 802.12 mode, before assertion of MRXDV carry frame priority of incoming frames on these pins, as described in FIG. 4. MCOL is used in 802.3u to indicate a network collision. However, in 802.12 mode, this line is used to acknowledge a transmission request and initiate transmission from the LAN controller. As will be described in more detail below, the LAN controller will begin frame transmission 50 MTCLK cycles after the assertion of MCOL.

It will be apparent to those of ordinary skill in the art once the tables in FIGS. 3 and 4 are understood that, in this preferred embodiment, the costly functions of 802.12, namely encoding and stream ciphering, are partitioned off the LAN controller 10 into the VG PHY 16 (FIG. 1). The remaining requirements of 802.12 on the LAN controller are, as will be described in more detail below, a subset of those functions required to implement 802.3u. This allows LAN controller 10 to provide 802.12 support for minimal extra cost, an important consideration for manufacturers of integrated circuits and integrators of LAN controllers.

With regard to the table shown in FIGS. 3 and 4, only that information important to an understanding of the operation of the preferred embodiment insofar as the principals of the present invention are implemented therein is disclosed. Further information is available in the IEEE standards for the 802.3u and 802.12 protocols.

Note that 802.12 data is transferred to/from the LAN controller 10 at an effective nibble rate of 25 MHz. The 802.12 PHY's clock rate is, however, 30 MHz because of the 5B6B coding scheme used. The PHY creates the receive and transmit clocks for the LAN controller 10, and synchronizes the LAN controller to fit to its coding scheme by providing the LAN controller 10 with a clock derived from its own 30 MHz clock, but with one in six clock high phases deleted to create an effective 25 MHz clock. Also note that the LAN controller 10 passes data to the VG PHY 16 without delimiters in 802.12 mode.

Note also that a simple request/grant interface between the LAN controller 10 and the VG PHY 16 controls access to the network. Also note that this request/grant technique embedded in the interface could allow other protocols to exist on the PMD side of the PHY, as well, using this same MII interface technique. The LAN controller 10 signals a request to transmit on the TXD0–TXD3 lines, and the VG PHY 16 signals back a grant on the MCOL line.

The network priority of incoming frames, in 802.12 mode, is signaled to the LAN controller 10 on the MRXD0–MRXD3 lines in the cycle before the first valid frame data nibble.

Demand priority protocol line state information, in 802.3u mode, is communicated through the 802.3u MII serial management interface line MDIO. As the VG PHY 16 is responsible for all 802.12 network access functions, the LAN controller 10 does not need direct access to the states in 802.12 mode.

Finally, the MII serial management interface, which will be described in detail below, has been enhanced to provide an interrupt facility. This allows the LAN controller 10 to received rapid notification of changes in network status. The existing 802.3u and 802.12 LAN standards do not provide this facility, so determination of network state would otherwise require constant polling of the interface. This has been avoided in the preferred embodiment. Interrupts are signaled on the MDIO signal line between serial management data frames. The PHY device can signal an interrupt by asserting the MDIO signal line low if the management interface clock signal MDCLK is high. This operates in both 802.3u and 802.12 mode.

Figure 5:
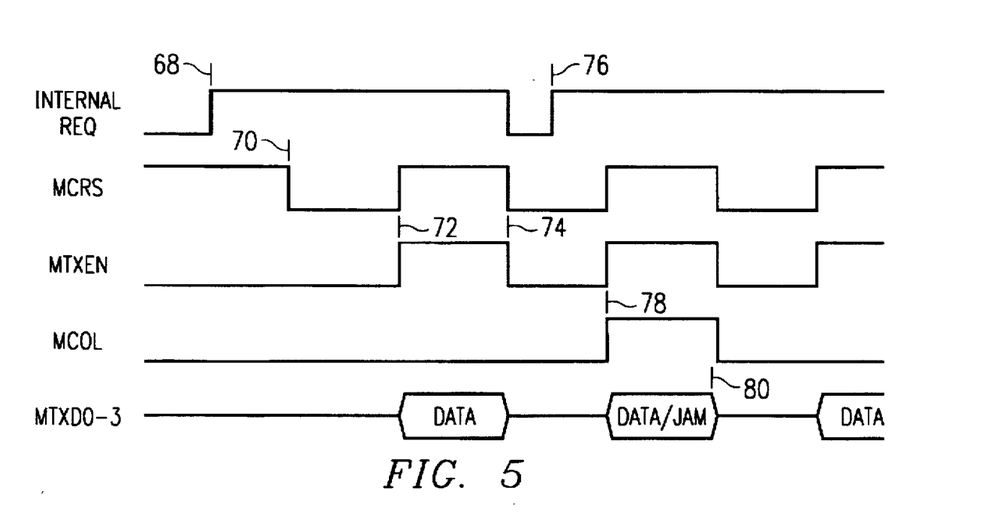
FIG. 5 is a signal timing diagram of signals used in the fast ethernet transmit mode by the preferred embodiment.

FIG. 5 is a diagram showing signal levels and timing for lines MCRS, MTXEN, MCOL and MTXD0–MTXD3, in the case of frame transmission in 802.3u mode, compared with the internal request signal within the Serializer/Deserializer 52 (FIG. 2), communicating an internal request for transmission. As shown, the internal request line goes active high at time 68. Assuming line 42 (FIG. 1) is in active use at that time, sometime later, at point 70, the MCRS line goes low, indicating line availability. A predetermined time interval later, determined in accordance with 802.3u defined standards, at point 72, the MTXEN line goes active high, indicating valid transmit data on MTXD0–3. Simultaneously, those lines transmit data, as shown. When the data transmission is complete, at time 74, both MTXEN and MCRS go low, as shown.

Assuming a second internal request for transmission, at time 76, if a collision occurs, shown in signal line MCOL going high, transmission of data on lines MTXD0–MTXD3 is terminated and "jam" data is substituted therefor for a predetermined interval, all according to the 802.3u standard, as shown in FIG. 5.

Figure 6:
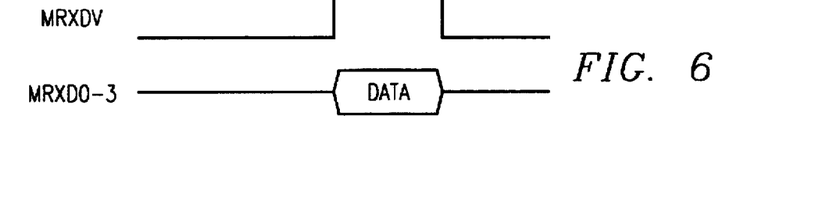
FIG. 6 is a signal timing diagram like that of FIG. 5, however, showing signals used in receive mode.

The reception of data in the 802.3u mode is quite simple, being illustrated in FIG. 6. The MRXDV line goes active high indicating valid data on lines MRXD0–MRXD3, which receive the data, as shown.

Figure 7A:
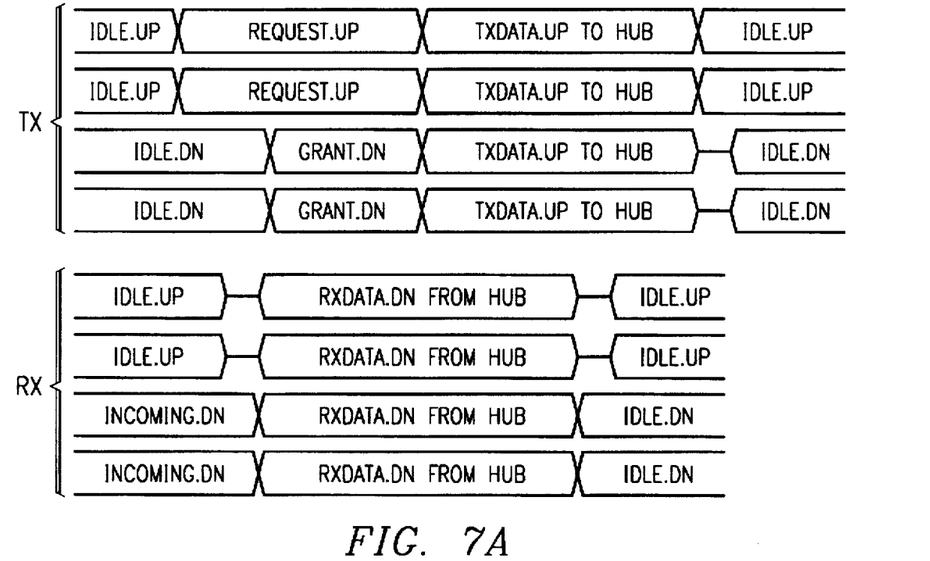
FIG. 7A and 7B are signal timing diagram of signals appearing on the four network wires at the interface of the preferred embodiment to the VG AnyLAN network.

FIG. 7A shows, in VG mode, the signals on the four network wires during a transmit operation and during a receive operation, respectively, the top four lines representing a transmit operation, and the bottom four lines representing a receive operation. The two wires represented by the top two lines are called WIRE0 and WIRE 1, while the wires represented by the bottom two lines are called WIRE2 and WIRE3. The suffix UP indicates that the signal is being sent from the adapter to the hub, at the other end of the network wires, while the suffix .DN indicates the reverse, that is, that the signal is being sent to the adapter from the hub. Dashes indicate silence, or absence of signal.

Prior to a transmit operation it is assumed that the adapter is idle, and so is sending idle signal on WIRE0 and WIRE1. The hub, in turn, is sending an idle signal reply on WIRE2 AND WIRE3. The adapter then sends a request signal to the hub on WIRE0 and WIRE 1, in response to which the hub sends a grant signal on WIRE2 and WIRE3. It will be noted that the grant signal takes the form of silence, or no signal, i.e., dashes could be used to indicate GRANT.DN. In response, the adapter sends the data, TXDATA, on all four wires. When TXDATA transmission is complete, an idle signal is sent on WIRE0 and WIRE1, in response to which the hub returns an idle signal on WIRE2 and WIRE3.

In a receive operation, the adapter is sending an idle signal on WIRE0 and WIRE 1, indicating it is in a ready state for a receive operation. The hub sends an incoming signal on WIRE2 and WIRE3. In response, the adapter indicates a grant to the hub by putting no signal on WIRE0 and WIRE 1, shown by the dashes. The data, RXDATA, is then received on all four wires. When RXDATA transmission from the hub is complete, the hub sends an idle signal on WIRE2 and WIRE3, in response to which the adapter returns an idle signal on WIRE0 and WIRE1.

Figure 7B:
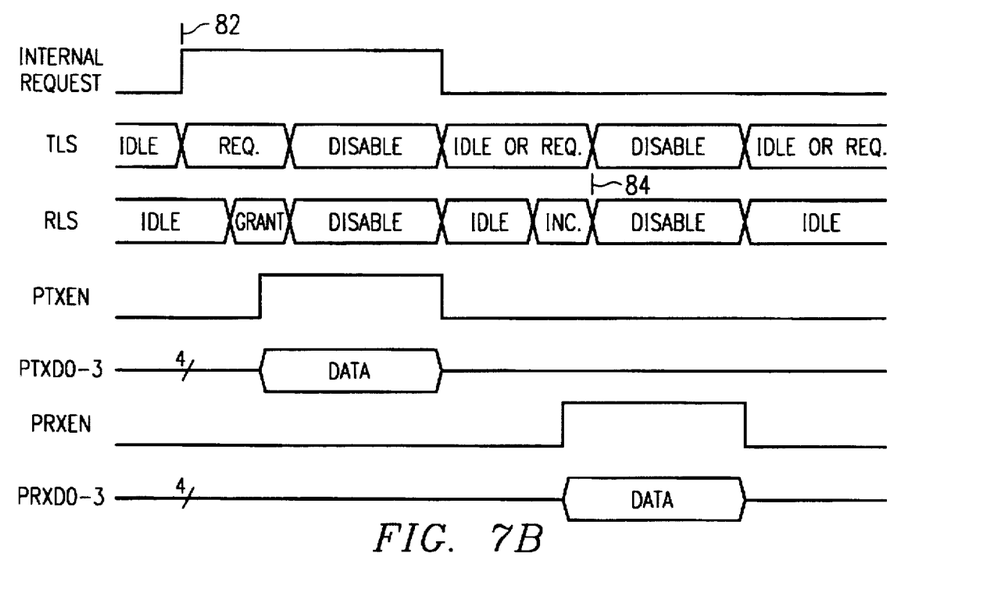

FIG. 7B shows signals TX Line State (hereinafter sometimes referred to as TLS), RX Line State (hereinafter sometimes referred to as RLS), PTXEN, PRXEN, signals internal to the VG PHY 16 (FIG. 1), compared to the internal request signal received by LAN controller 10, during the transmit and receive operations described above in conjunction with FIG. 7A. As shown, both of the two TLS signals are idle until the internal request line goes high at time 82; at which time TLS transmits a request signal, in response to which the RLS signal lines receive a grant request. In response to the grant signal on RLS, the TXEN line goes active. Data is transmitted, on the PTXD0-3 lines, during the period that PTXEN is active. Subsequent to data transmission, both TLS and RLS return to idle, unless another request is queued, in which case TLS returns to a request state.

In the case of the reception of data RLS signals incoming data, shown at time 84, following which both TLS and RLS communicate a disable code, and PRXEN line goes active high, as shown. Following the receipt of data, the PREXEN lines go inactive low and the TLS and RLS lines return to idle.

Figure 8:
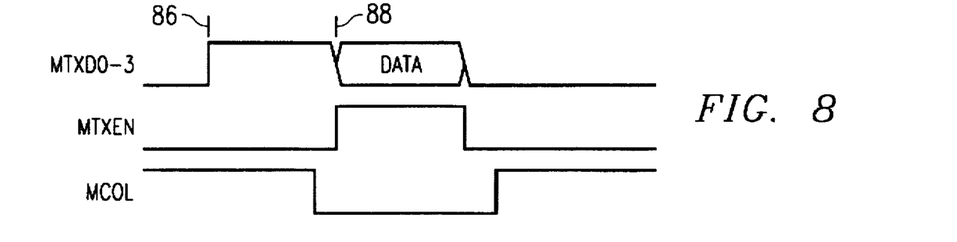
FIG. 8 is a signal timing diagram showing signals used in transmit in VG mode of the LAN controller of the preferred embodiment.

FIG. 8 shows lines MTXD0-MTXD3, MTXEN and MCOL, and shows signal level and timings for a data transmit series. At time 86, MTDX0 only (MTXD2-3 are not used during this cycle) goes active high, indicating a frame transmission request. At the same time, MTXD1 indicates the priority of the request. A fixed time after MCOL goes low, at time 88, the data is actually transmitted. During this time, MTXEN is active high, indicating valid data transmitted. During the data transmission, MCOL is active low.

Figure 9:
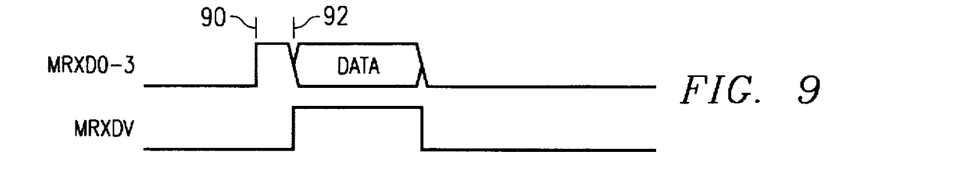
FIG. 9 is a signal timing diagram like that of FIG. 8, however, showing signals in receive mode.

FIG. 9 shows a data reception timing and signal diagram at the interface between LAN controller 10 and the VG PHY 16 (FIG. 1). At time 90, MRXD1 goes active (MRXD0 and MRXD2 and 3 are not used in this cycle), indicating the originating priority of the received frame. At the end of this cycle, at time 92, the data is received on lines MRXD0-3, when MRXDV is also active, as shown).

Figure 10:
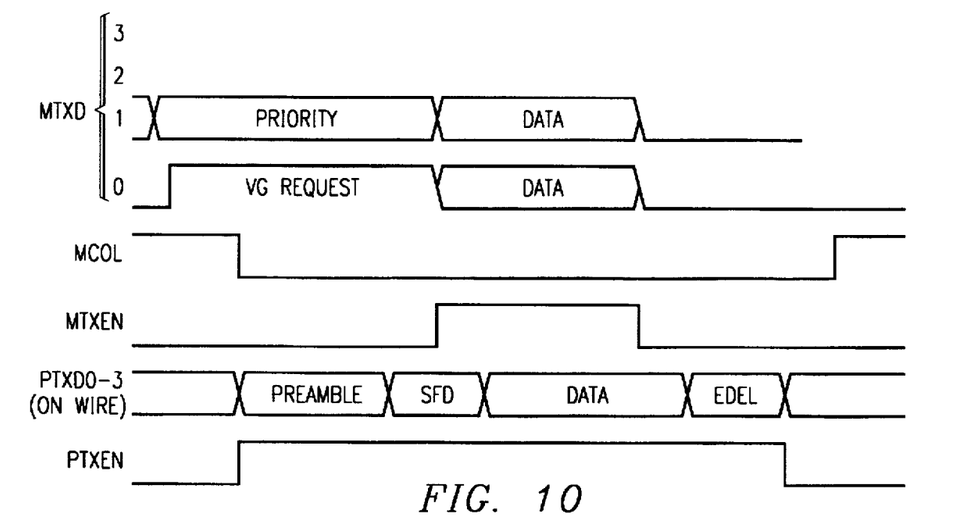
FIG. 10 is a signal timing diagram of the signals appearing at the interface of the preferred embodiment, to a VG network.

FIG. 10 is a diagram that shows in more detail the signals and timings thereof of the set of signals shown in FIG. 8, along with the signals appearing on the network wire, for comparison. When MTXD0 becomes active, with MTXEN not asserted, PHY controller 10 (FIG. 1) generates a transmission request. The priority of that request is indicated by the sense of MTXD1, high being high priority and low being low priority. Grant is indicated by assertion of MCOL. Fifty cycles after the assertion of (low) of MCOL, data is transmitted on MTXD0 through MTXD3, followed by the transmission of idle control data on those lines. It will be noted that the reason data transmission begins 50 MTCLK cycles after the assertion of MCOL is that the VG PHY 16 (FIG. 1) generates and transmits the preamble and SFD portion of the frame transmission in response to the assertion of MCOL, acknowledging the transmission request from PHY controller 10. This takes up to 50 cycles. The VG PHY 16 then looks for the data from LAN controller 10 at the 50th cycle scrambles and encodes the data, and then places EDEL on the transmission line. This procedure eliminates a requirement for buffering of data in the VG PHY 16.

Figure 11:
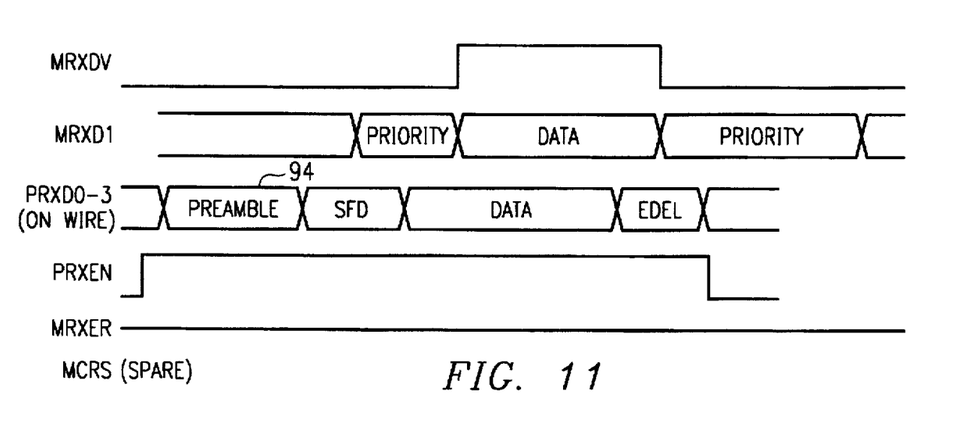
FIG. 11 is a more detailed signal timing diagram of the signals shown in FIG. 9.

FIG. 11 is a more detailed diagram of the signals shown in FIG. 9, as well as the signal on the wire to the network, for comparison against the signals. It will be recalled that these signals are the signals at the LAN controller 10 VG PHY 16 interface during reception of data in VG mode. When the reception is detected by the VG MAC State Machine 102 (FIG. 12), the PRXEN Signal is then driven active. The data on the wire begins with the preamble 94, followed by the SFD, which is decoded by the VG PHY 16 and from which the priority is extracted and placed on MRXD1, as shown. Upon completion of the sending of the priority, MRXDV is asserted active high and data is placed on MRXD0-MRXD3. MRXER remains low throughout indicating reception of no coding errors on the received data, MCRS not being used in VG mode.

Figure 12:
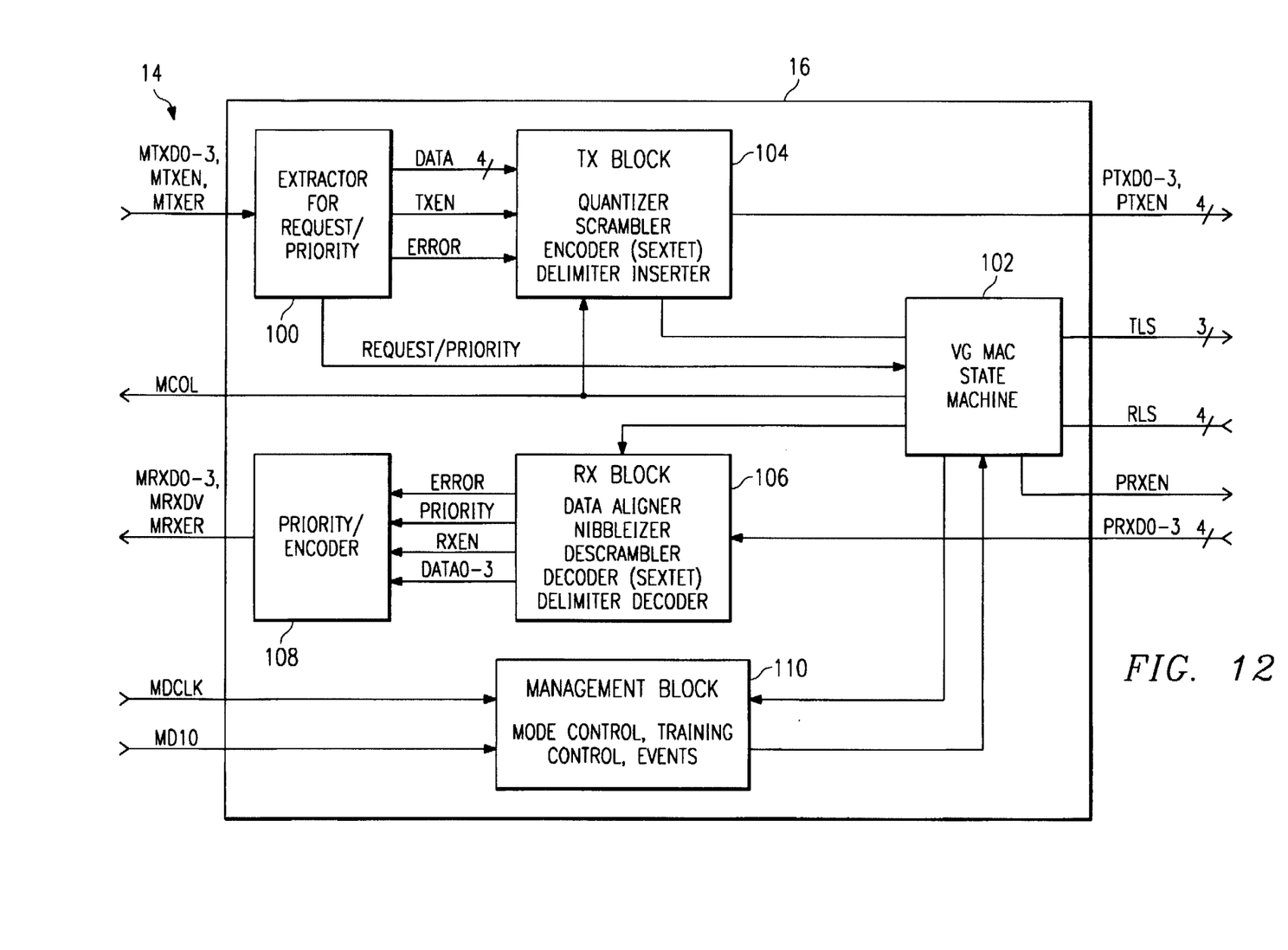
FIG. 12 is a block diagram of a VG PHY unit of the preferred embodiment.

FIG. 12 is a detailed block diagram of the PMI unit 22 of the VG PHY 16 of FIG. 1. The defined signal lines 14 whose functionality is defined in the table of FIG. 4, can be seen at the left of diagram. The signal lines MTXD0-MTYXD3, MTXEN and MTXER are provided to extractor 100 which extracts the request signal from MTXD0, and extracts the priority signal from MTXD1, while passing through MTXER as well as MTXD0-MTXD3 as data signals.

The data lines, TXEN and error lines are provided to a TX block 104, as shown. The TX block 104 takes the incoming four data lines and arranges the data in groups of five bits. These groups of five bits are then scrambled as groups and encoded to Sextets, in accordance with known 5B6B principals. A delimiter is inserted and the resultant signals are provided as an output of TX block 104 on lines PTXD0-PTXD3 and PTXEN. Signals TLS are generated in control block 102 and provided as an output, as shown.

In reception, signal lines PRXD0-PRXD3 and PRXEN are provided to RX block 106, receive signals RLS being provided to control block 102. RX block 106 performs those operations that are the reverse of those performed in TX block 104. Thus, RX block 106 decodes the delimiter, in order to determine data extent, decodes the sextet form of data, de-scrambles it five bit groups, "nibblizes" those five bit groups to four bit nibbles, and, finally aligns the data for sending to priority/encoder block 108. Error, priority and RXEN signals are also generated in RX block 106 and provided to priority encoder block 108, all according to known principals. Priority encoder block 108 provides as outputs signals MRXD0-MRXD3, MRXDV and MRXER, as shown.

Finally, management block 110 interacts with control block 102 and provides the functions of mode control, training control and monitoring of events. It receives as inputs from LAN controller block 10 (FIG. 1) signal lines MDCLK and MDIO.

Several of the individual blocks described generally above conjunction with FIG. 12 will now be described in more detail.

Figure 13:
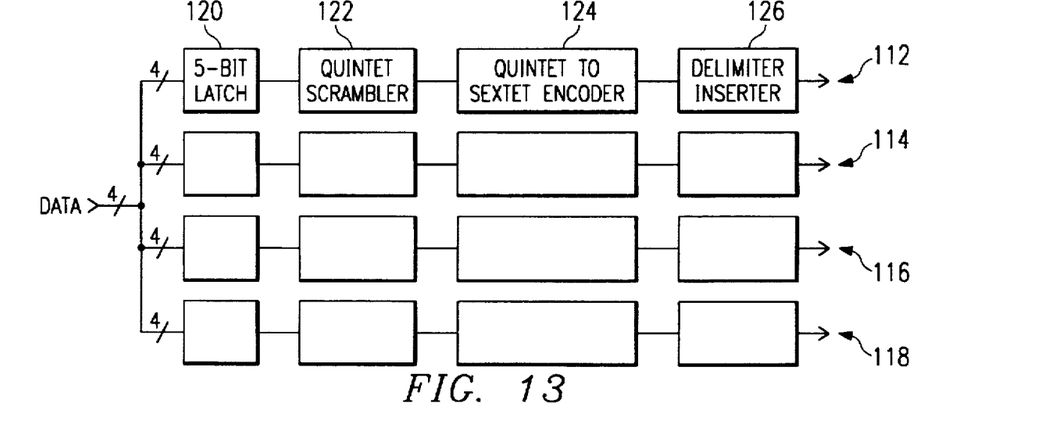
FIG. 13 is a detail block diagram of the transmit block of the PHY block shown in FIG. 12.

FIG. 13 is a detailed block diagram of transmission blocks 104 of FIG. 12. This unit consists of four identical serially connected groups of functional units 112, 114, 116 and 118 that comprise four data paths through the block. Data comes in on the four data lines and is provided to each of the five bit latches, as shown. The data is grouped in five bit groups and then passed along to the next functional unit in the path. Thus, looking at signal path 112, the five bit latch 120 passes the data to quintet scrambler 122, which performs the quantizing function mentioned above, and passes the quantized data to the quintet to sextet encoder 124. This unit 124 performs the encoding described above and passes the thus scrambled and encoded data to delimiter inserter 126. The resultant data is output from block 104. Implementation of the functions described in conjunction with the constituent blocks of transmit block 104, described in conjunction in FIG. 13 are all known in the art.

Figure 14:
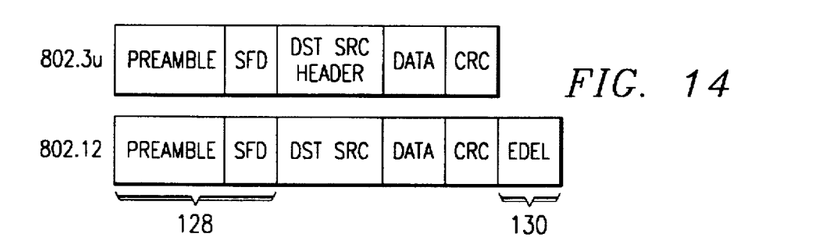
FIG. 14 is a diagram of the data formats for an 802.3u defined frame and an 802.12 defined frame.

FIG. 14 is a diagram showing the formats of a data frame according to the 802.3u standard and 802.12 standard, respectively. Significant to note in conjunction with the embodiment disclosed herein is that the preamble, SFD and EDEL groups of data 128, 130, are added by the PMI block 22 (FIG. 1, FIG. 12).

Figure 15:
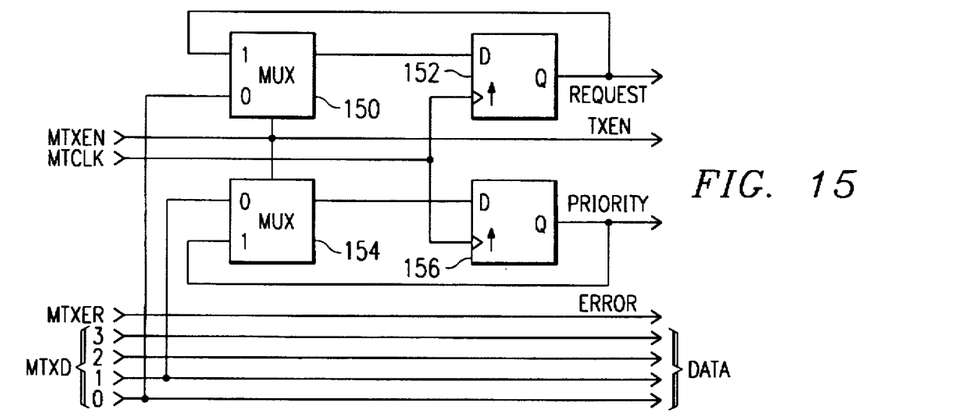
FIG. 15 is a diagram of the extractor of the PHY block shown in FIG. 12.

FIG. 15 is a detailed circuit diagram of extractor 100, showing the use of multiplexers and one-shots to accomplish the aforementioned extraction. As can be seen, REQUEST, which is multiplexed on MTXD0, is extracted by MUX 150 when MTXEN is low and latched in latch 152. Likewise, PRIORITY, which is multiplexed on MTXD1, is extracted by MUX 154 when MTXEN is low and latched in latch 156. MTXD0-3 are passed through, and become DATA0-1.

Figure 16:
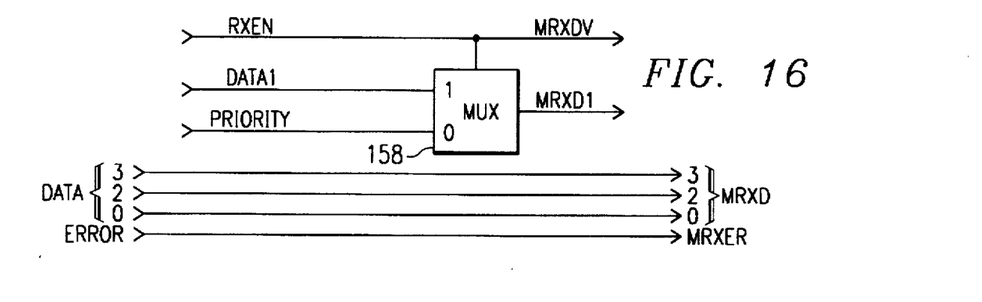
FIG. 16 is a diagram of the priority encoder of the PHY block shown in FIG. 12.

FIG. 16 is a detailed diagram of the priority/encoder 108 of FIG. 12. PRIORITY is multiplexed onto MRXD1 by MUX 158 when RXEN is low. Otherwise, MUX 158 routes DATA1 onto MRXD1. DATA0, and DATA2-3 are passed through as MRXD0 and MRXD2-3.

Figure 17:
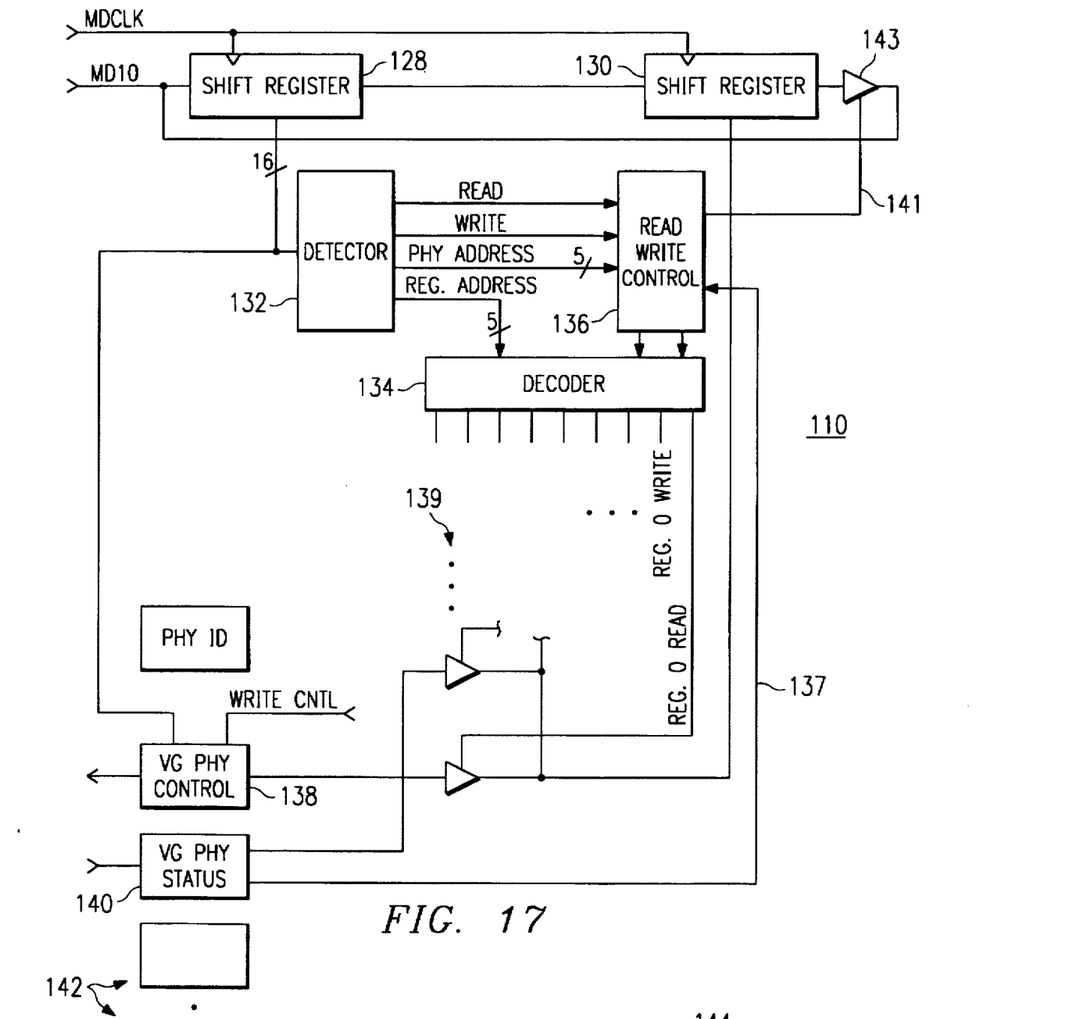
FIG. 17 is a diagram of the Management Block of the PHY unit shown in FIG. 12.

FIG. 17 is a detailed diagram of those portions of management block 110 significant to the novel aspects of the embodiment herein described. As can be seen, shift registers 128, 130 receive data from MDIO, the serial management interface from LAN controller 10 (FIG. 1), and are clocked by MDCLK. Detector 132 extracts from the shifted data in shift register 128 read command, write command, register address and PHY address, and provides the corresponding output signal to decoder 134 and read/write control 136, as shown. The data in shift register 128 then can be loaded into any of the VG PHY registers 138, 140, 142, by the application of a write command on MDIO, as shown.

A VG PHY status register 140, as well as other defined registers 142 are also provided, in addition to VG PHY Control Register 138, as shown. The output of registers 138, 140, 142, in conjunction with Read Control tri-state buffers 139, allow the register data to be written to register 130 in conjunction with read/write control block 136 allowing the LAN Controller to shift out the data, using shift register 130, thus effecting a read of data from the requested register. While the structure and operation of management block 110 shown in FIG. 17 is generally known, newly provided in the preferred embodiment described herein is an interrupt scheme implemented on the above-described two-wire management interface. To signal an interrupt, when the management block 110 is not in an MDIO read or write management frame, if a bit is set in the VG PHY Status Register 140 (other registers could also be used for this purpose) that is associated with an interrupt event, line 137 goes active, signaling this to Read Write Control Block 136. Control Block 136 forces MDIO, which is normally held high if not being used, low by activating line 141, causing tri-state buffer 143 to hold its output low. When MDCLK is high, this low value on the MDIO line signals the interrupt.

Figure 18:
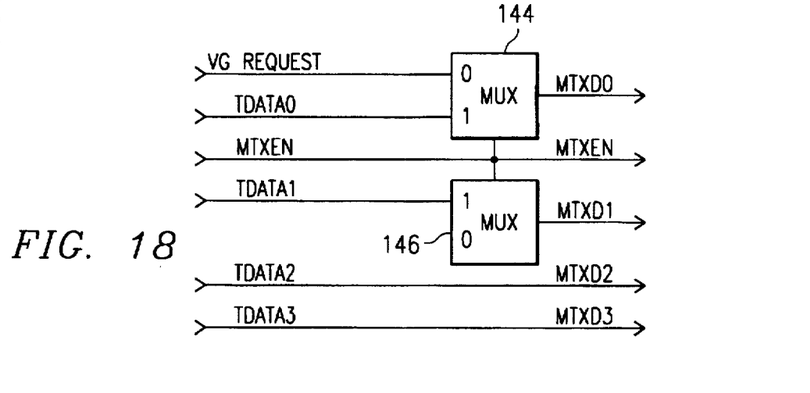
FIG. 18 is a diagram of the VG portion of the priority encoder of the controller 10 block 58 shown in FIG. 2.
Figure 19:
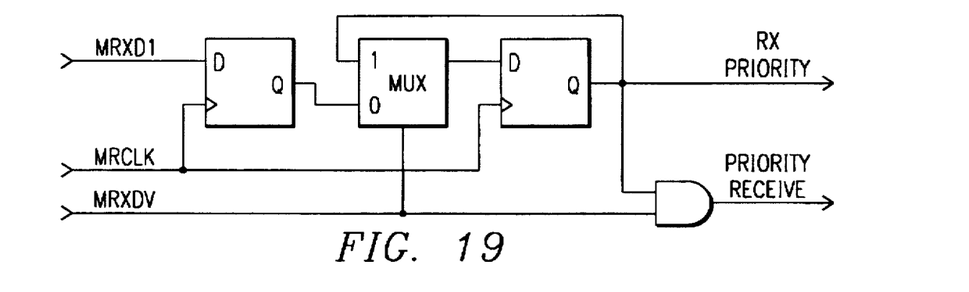
FIG. 19 is a diagram of the decoder portion of the VG State Machine 56 in the controller 10 shown in FIG. 2.

FIGS. 18 and 19 are detailed diagrams of the multiplexer functions implemented in multiplexer 58 of FIG. 2. As can be seen in FIG. 18, the MTXEN signal line is used in conjunction with multiplexers 144 and 146 to multiplex the VG request and TDATA0 on line MTXD0, and TDATA1 and priority on line MTXD1. As shown in FIG. 19, RX Priority and Priority Receive are extracted from MRXD1 and MRXDV. The RX Priority extracted here is the same RX Priority extracted from the received frame's SFD detected in the RX Block 106 (FIG. 12) and multiplexed onto lines MRXD0-3 in Priority/Encoder block 108.

Figure 20:
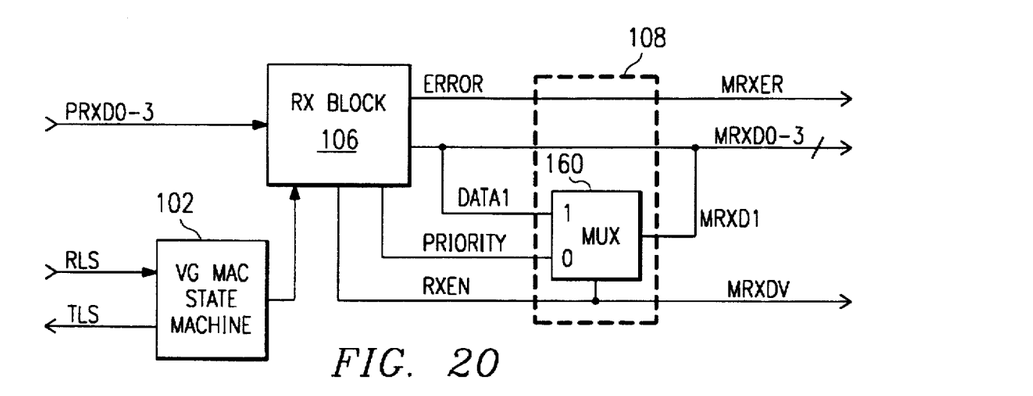
FIG. 20 is a diagram of the de-scrambler portion of the Receive Block in the PHY unit shown in FIG. 12.

FIG. 20 shows the de-scrambler portion of the RX Block 106 of FIG. 12, operating in conjunction with the VG MAC State Machine 102 and Priority/ Encoder 108. PRXD0-3 are inputted to the RX Block 106, which passes them through as MRXD0-3. RLS is applied as an input to the VG MAC State Machine 102, which provides as an output, TLS. The VG MAC State Machine also provides control information to RX Block 106. RX Block 106 provides the signals ERROR, PRIORITY and RXEN as outputs, in addition to the afore-mentioned MRXD0-3 signals.

PRIORITY is multiplexed onto MRXD1 by MUX 160, under control of RXEN. RXEN, in turn, is passed through Priority/Encoder block 108 as MRXDV.

Figure 21:
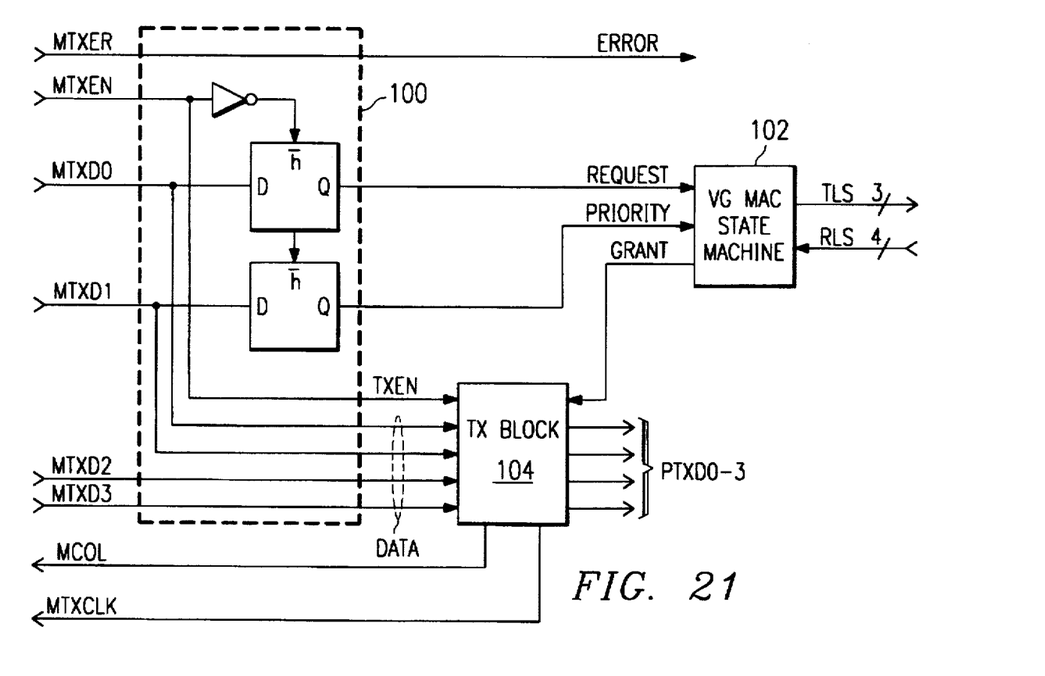
FIG. 21 is a block diagram illustrating the flow of control data during data transmit in VG mode, of the PHY unit shown in FIG. 12.

Finally, FIG. 21 is a block diagram illustrating the flow of control data during data transmit in VG mode, of the PHY unit shown in FIG. 12. Shown are the VG MAC State Machine 102, TX Block 104 and internal details of the Extractor for Request/Priority block 100. Signals MTXEN, MTXER and MTXD0-3 are all inputted to Extractor block 100, as shown. Signals MTXEN and MTXD0-3 are simply passed through to TX Block 104, which provides them as signals TXEN and PTXD0-3, respectively. TX Block 104 provides as outputs signals PTXD0-3, MCOL and MTXCLK, in response to the GRANT signal from VG MAC State Machine 102. Extractor 100, using latch 170, captures the REQUEST signal multiplexed on MTXD0 when MTXEN is low, and provides REQUEST to VG MAC State Machine 102. Similarly, when MTXEN is low, latch 172 captures the PRIORITY signal multiplexed on MTXD1, and provides PRIORITY to VG MAC State Machine 102. The TLS lines are an output of block 102, and the RLS lines are an input to block 102, as shown.

Having thus described one particular embodiment of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A multiprotocol local area network ("LAN") controller unit for coupling a computer, the computer including a system bus, to a PITY connectable to a LAN, wherein the LAN may operate according to the IEEE 803.3u LAN standard having a media independent interface ("MuI") layer, and according to the IEEE 802.12 LAN standard having a media dependent interface ("MDI") layer and a physical medium independent ("PMI") layer, comprising:

a data transfer control unit implementing the functions of the IEEE 803.3u LAN standard between a system bus and the MuI interface;

a physical connector including a plurality of signal lines implemented in accordance with the MuI interface portion of the IEEE 803.3u LAN standard, for connecting the multiprotocol LAN controller unit to a PHY unit, including at least two transmit data signal lines for transferring data to be transmitted over the network from the multiprotocol LAN controller unit to the PHY, a transmit enable signal line by which the multiprotocol LAN controller unit indicates to the PHY valid data on the at least two transmit data signal lines, a collision sense line by which the PHY indicates to the multiprotocol LAN controller unit that a network collision has occurred, at least two receive data signal lines for transferring data received from the network from the PHY to the multiprotocol LAN controller unit, and a receive data valid line by which the multiprotocol LAN controller unit indicates to the PHY valid data on the at least two receive data signal lines; and multiplexing means for transferring data to and from the multiprotocol LAN controller unit according to the IEEE 802.12 LAN standard using the signal lines, including means for providing a transmit request signal on a first one of the transmit data signal lines when the transmit enable signal line is not active to indicate valid data, means for providing a priority signal on a second one of the transmit data signal lines when the transmit enable signal line is not active to indicate valid data, means for receiving a transmit request acknowledgement signal on the collision sense line, and means for receiving a priority signal on a first one of the receive data signal lines prior to the receipt of a receive data valid signal on the receive data valid line.

2. A local area network ("LAN") controller system for coupling a computer, the computer including a system bus, to a LAN, wherein the LAN may operate according to the IEEE 803.3u LAN standard having a media independent interface ("MuI") layer, and according to the IEEE 802.12 LAN standard, having a media dependent interface ("MDI") layer and a physical medium independent ("PMI") layer, comprising:

a multiprotocol LAN controller unit, including a data transfer control unit implementing the functions of the IEEE 803.3u LAN standard between a system bus and the MII standard, a physical connector including a plurality of signal lines implemented in accordance with the MuI portion of the IEEE 803.3u standard, for connecting the multiprotocol LAN controller unit to a PHY unit, including at least two transmit data signal lines for transferring data to be transmitted over the network from the multiprotocol LAN controller unit to the PHY, a transmit enable signal line by which the multiprotocol LAN controller unit indicates to the PHY valid data on the at least two transmit data signal lines, a collision sense line by which the PHY indicates to the multiprotocol LAN controller unit that a network collision has occurred, at least two receive data signal lines for transferring data received from the network from the PHY to the multiprotocol LAN controller unit, and a receive data valid line by which the multiprotocol LAN controller unit indicates to the PHY valid data on the at least two receive data signal lines;

multiplexing means for transferring data to and from the multiprotocol LAN controller unit according to the IEEE 802.12 LAN standard using the signal lines, including means for providing a transmit request signal on a first one of the transmit data signal lines when the transmit enable signal line is not active to indicate valid data, means for providing a priority signal on a second one of the transmit data signal lines when the transmit enable signal line is not active to indicate valid data, means for receiving a transmit request acknowledgement signal on the collision sense line, and means for receiving a priority signal on a first one of the receive data signal lines prior to the receipt of a receive data valid signal on the receive data valid line; and a PHY, connectable between a LAN implemented in accordance with the IEEE 802.12 LAN standard and the multiprotocol LAN controller unit, including the following functional units implemented in accordance with the IEEE 802.12 LAN standard, an extractor for request/priority, a transmit block, including a quantizer, scrambler, encoder and delimiter inserter, a priority/encoder, a receive block, including a data aligner, nibbleizer, descrambler, a decoder and a delimiter decoder, and a state machine for controlling the operation of the PHY.

3. A local area network ("LAN") controller system for coupling a computer, the computer including a system bus, to a LAN, wherein the LAN may operate according to the IEEE 803.3u LAN standard, and according to the IEEE 802.12 LAN standard, having a second media dependent interface ("MDI") layer and a second physical medium independent ("PMI") layer, comprising:

a multiprotocol LAN controller unit, including a data transfer control unit implementing the functions of the IEEE 803.3u LAN standard between a system bus and an MII interface implemented according to the IEEE 803.3u LAN standard, and a physical connector including a plurality of signal lines implemented in accordance with the IEEE 803.3u standard for the MII interface, for connecting the multiprotocol LAN controller unit to a PHY unit, including at least two transmit data signal lines for transferring data to be transmitted over the network from the multiprotocol LAN controller unit to the PHY, a transmit enable signal line by which the multiprotocol LAN controller unit indicates to the PHY valid data on the at least two transmit data signal lines, a collision sense line by which the PHY indicates to the multiprotocol LAN controller unit that a network collision has occurred, at least two receive data signal lines for transferring data received from the network from the PHY to the multiprotocol LAN controller unit, and a receive data valid line by which the multiprotocol LAN controller unit indicates to the PHY valid data on the at least two receive data signal lines;

multiplexing means for transferring data to and from the multiprotocol LAN controller unit according to the IEEE 802.12 LAN standard using the signal lines, including means for providing a transmit request signal on a first one of the transmit data signal lines when the transmit enable signal line is not active to indicate valid data, means for providing a priority signal on a second one of the transmit data signal lines when the transmit enable signal line is not active to indicate valid data, means for receiving a transmit request acknowledgement signal on the collision sense line, and means for receiving a priority signal on a first one of the receive data signal lines prior to the receipt of a receive data valid signal on the receive data valid line; and a PHY, connectable between a LAN implemented in accordance with the IEEE 802.3u LAN standard and the multiprotocol LAN controller unit.

* * * * *